United States Patent

[11] 3,524,371

| [72] | Inventors | Gerhard Kröger<br>Veitsbronn, Germany;<br>Erich Goppert, Erlangen, Germany |
|---|---|---|
| [21] | Appl. No. | 750,658 |
| [22] | Filed | Aug. 6, 1968 |
| [45] | Patented | Aug. 18, 1970 |
| [73] | Assignee | Siemens Aktiengesellschaft<br>Berlin, Germany and Munich, Germany<br>a Corp. of Germany |
| [32] | Priority | Aug. 12, 1967 |
| [33] | | Germany |
| [31] | | No. S111340 |

[54] APPARATUS UTILIZING INTEGRATING MOTOR FOR MEASURING THE LENGTH OF YARN IN A TEXTILE MACHINE
7 Claims, 4 Drawing Figs.

[52] U.S. Cl. ..................................... 83/369, 33/132
[51] Int. Cl. ....................................... B26d 5/40, G01b 7/04
[50] Field of Search .......................... 83/208, 369; 33/129, 132, 132.5

[56] References Cited
UNITED STATES PATENTS

| 2,852,195 | 9/1958 | Coleman et al. | 33/129 |
| 3,058,223 | 10/1962 | Schmidt et al. | 33/129 |
| 3,177,749 | 4/1965 | Best et al. | 83/208 |
| 3,406,601 | 10/1968 | Clifford | 83/208X |

*Primary Examiner*— William S. Lawson
*Attorneys*—Curt M. Avery, Arthur E. Wilfond, Herbert L. Lerner and Daniel J. Tick ABSTRACT: A pulse generator driven in synchronism with the speed of movement of yarn produces output pulses corresponding in number to the length of the yarn. A converter coupled to the output of the pulse generator converts the frequency of the output pulses of the pulse generator to a corresponding voltage. A brushless DC motor connected to the output of the converter has a rotary speed proportional to the voltage produced by the converter. A counter coupled to the motor counts in cooperation with the motor to indicate a desired length of yarn.

Patented Aug. 18, 1970 3,524,371

APPARATUS UTILIZING INTEGRATING MOTOR FOR MEASURING THE LENGTH OF YARN IN A TEXTILE MACHINE

DESCRIPTION OF THE INVENTION

The present invention relates to the measurement of the length of yarn. More particularly, our invention relates to apparatus utilizing an integrating motor for measuring the length of yarn in a textile machine.

Our apparatus measures the length of yarn which moves past a measuring point and utilizes a pulse generator which is driven in synchronism with the speed of movement of the yarn. The integrated output pulses of pulse generator serve as a measurement of the length of the yarn.

In pre-weaving, weaving, and the like machinery used in the chemical fiber industry and in the coil winding art such as, for example, the production of relays and the like, there is a frequent need for determining as closely as possible the length of yarn or wire wound on a spool or in a coil. In a known method, the diameter of the finished coil is sensed.

If too little yarn or a short length of yarn is wound in a yarn coil or on a yarn spool, the manufacturer suffers a price reduction and further processing operations are disrupted. Thus, especially in the chemical fiber industry, it has become customary to add, ahead of time, an extra 5% to the length of the yarn in order to be on the safe side. Since the additional 5% length may constitute a loss, it is desireable that it be avoided, and it may be avoided if the length of the yarn is more exactly measured.

Many suggestions for measuring the length of yarn more accurately have been made. One of the proposed systems utilizes a pulse generator driven in synchronism with the speed of movement of the yarn and the pulses are counted. If it is considered, however, that a yarn up to 400 km. in length may be wound on a spool or in a coil and that the yarn speed may fluctuate between 300 and 1500 meters per minute, it becomes clear that the number of pulses involved may be correctly processed only by electronic counters having high storage capacities. Electronic counters are relatively expensive, however, and if it is considered that there are sometimes up to 100 measuring points in a machine, and that a counter is required for each measuring point, it is readily understood that the exact counting technology has not yet been provided or discovered.

The invention arises from the fact that the digital counting technique, which provides considerable accuracy, should be maintained as far as feasible.

The principal object of the present invention is to provide new and improved apparatus for measuring the length of yarn moving past a measuring point.

An object of the present invention is to provide apparatus for measuring the length of yarn which apparatus is simple in structure and inexpensive in manufacture.

An object of the present invention is to provide apparatus for measuring the length of yarn, which apparatus is efficient, accurate and reliable in operation.

In accordance with the present invention, the output of the pulse generator is supplied to a frequency-voltage converter whose output voltage controls an integrating motor. The integrating motor itself is mechanically coupled to an adjustable roller counting mechanism, and the zero point, level or position of the counter functions as a measure for the length of the yarn. A brushless DC motor may be utilized as the integrating motor, since it is safe to operate. The pulse generator is preferably coupled to a measuring roller which is in contact with and rotated by the yarn.

The pulse generator may comprise, for example, a disc which is mechanically coupled to the shaft of the measuring roller, said disc having permanent magnets affixed thereto. Stationary Hall generators, provided in operative proximity with the disc, convert the magnetic pulses produced by the magnets into voltage pulses. It is also feasible to eliminate the separate disc and to magnetize the shaft end of the measuring roller in an appropriate manner. It may also be preferable, in our opinion, to eliminate a separate measuring roller and to couple the pulse generator directly to a component already present in the machine such as, for example, the traversing drum of the winding or coil machine.

In accordance with the present invention, apparatus for measuring the length of yarn moving past a measuring point comprises a pulse generator driven in synchronism with the speed of movement of the yarn for producing output pulses corresponding in number to the length of the yarn. A frequency to voltage converter coupled to the output of the pulse generator converts the frequency of the output pulses of the pulse generator to a corresponding voltage. An integrating motor connected to the output of the converter has a rotary speed proportional to the voltage produced by the converter. A counter coupled to the motor counts in cooperation with the motor to indicate a desired length of yarn.

The counter is set to a count corresponding to a desired length of yarn and the motor drives the counter backward so that the desired length of yarn is indicated when the counter reaches a zero count. The integrating motor may comprise a brushless DC motor. The yarn may be in contact with a measuring roller at the measuring point and the measuring roller rotates with movement of the yarn. The pulse generator is then coupled to the measuring roller. The pulse generator may comprise a rotary member and magnetic means for indicating the revolutions thereof. A yarn cutter is connected to the output of the counter for cutting the yarn when the counter reaches the zero point.

In order that the present invention may be readily carried into effect, it will now be described with reference to the accompanying drawing, wherein.

Figure 1:
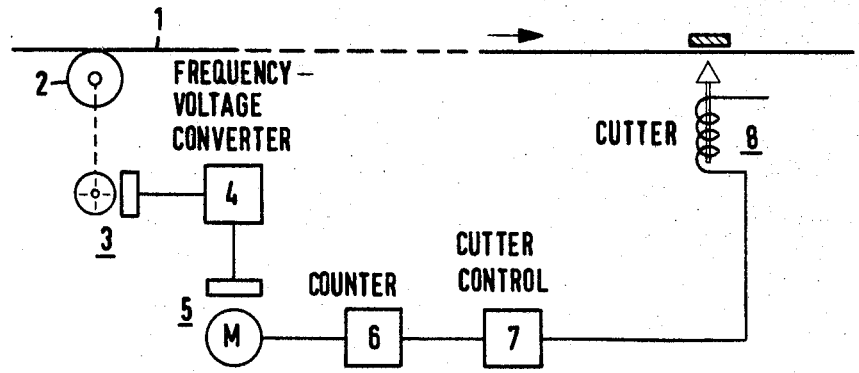
FIG. 1 is a schematic block diagram of an embodiment of the apparatus of the present invention for measuring the length of yarn moving past a measuring point.

In FIG. 1, yarn 1 contacts and moves across a measuring roller 2. The measuring roller 2 is mechanically coupled to a magnetic pulse generator 3. The pulse generator 3 is thus driven in synchronism with the speed of movement of the yarn 1 and produces output pulses corresponding in number to the length of the yarn. That is, each pulse produced by the pulse generator 3 represents a specific length such as, for example, 10 cm., of the yarn 1.

A frequency to voltage converter 4 coupled to the output of the pulse generator 3 converts the frequency of the output pulses of said pulse generator to a corresponding voltage. The output voltage of the converter 4 is thus in proportion with the repetition rate or frequency of the output pulses produced by the pulse generator 3.

Figure 2:
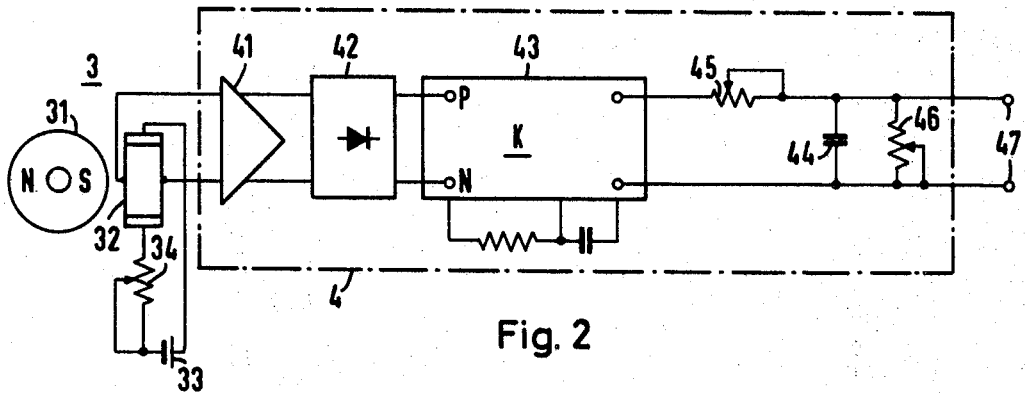
FIG. 2 is a schematic diagram of an embodiment of the pulse generator 3 and the frequency to voltage converter 4 of FIG. 1.

As shown in FIG. 2, the pulse generator 3 may comprise a disc 31 which is mechanically coupled to the shaft of the measuring roller 2 (FIG. 1). The disc 31 is either permanently magnetized or carries permanent magnets affixed thereto. A stationary Hall generator 32 is positioned in operative proximity with the disc 31 and is suitably biased by a current from a voltage source 33 and a variable resistor 34, which source and resistor are connected to corresponding current bias electrodes thereof. The Hall generator produces voltage pulses at its Hall voltage output electrodes which voltage pulses are converted from the magnetic pulses produced by the magnets or magnetization of the disc 31.

As shown in FIG. 2, the voltage pulses produced by the pulse generator 3 are supplied to an amplifier 41 of the frequency to voltage converter 4. The amplified pulses are rectified in the converter 4 by a rectifier 42. The converter 4 further comprises a stabilizing time stage 43, connected to the output of the rectifier 42, which is triggered by each pulse produced by the pulse generator 3, amplified and rectified. The stabilizing time stage 43 produces an output pulse of constant width. The output pulses of the stabilizing time stage 43 are integrated in an integrator comprising a capacitor 44 and a variable resistor 45, connected to the output of said stage. The integrated voltage, provided at output terminals 47, corresponds to the pulse frequency of the pulse generator 3.

An integrating motor 5 (FIG. 1) is connected to the output of the frequency to voltage converter 4 and has a rotary speed proportional to the voltage produced by said converter. The motor 5 is preferably a brushless DC motor of any suitable type known in the art such as, for example, that shown and described in copending patent application Serial No. 634,212, filed April 27, 1967, and illustrated in FIGS. 3 and 4 hereof.

Figure 4:
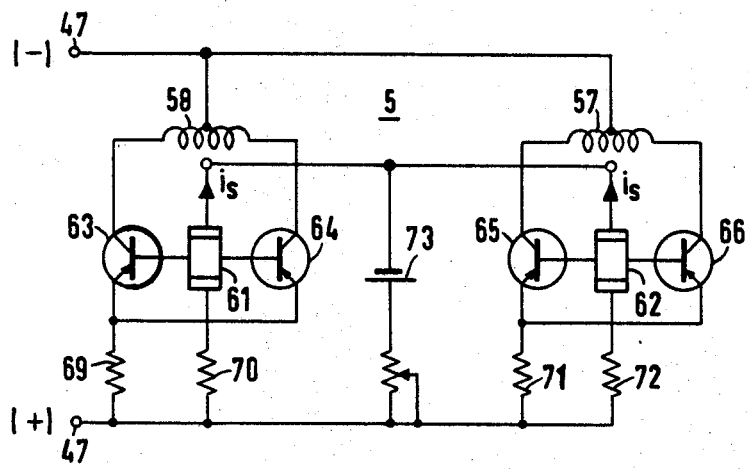
FIG. 4 is a circuit diagram of the brushless DC motor of FIG. 3.
Figure 3:
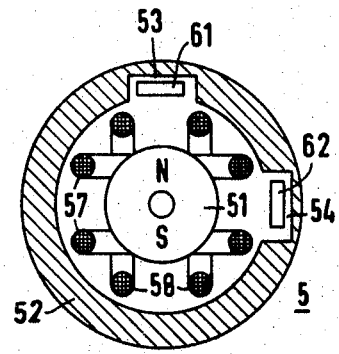
FIG. 3 is a view, partly in section, of a known brushless DC motor which may be utilized as the motor 5 of FIG. 1.

The brushless motor of FIG. 3 comprises a rotor 51 which is substantially constituted by a permanent magnet of cylindrical shape which is transversely magnetized, this being indicated by the magnetic pole designations N and S. The rotor is concentrically surrounded by a ring-shaped stator structure formed as a stack of laminations and denoted by 52. The stator further comprises two windings 57 and 58, each having two half-portions. The ring-shaped stack 52 is shown provided with two recesses 53 and 54 which face the rotor 51 and accommodate respective Hall generators 61 and 62. Each Hall generator is of conventional design, having the shape of a rectangle with two current terminals at the two short sides and two Hall voltage electrodes at the two long sides midway between the short sides, as shown in FIG. 4. The Hall generators may comprise wafers of indium antimonide or other suitable semiconductor material, the necessary contacts and electrodes being formed by metal depositions. For further details of the motor construction, though not pertinent to the present invention proper, reference may be had to the publication by W. Dittrich and E. Rainer in Siemens Review, Vol. 34, No. 3 (March, 1967), pages 97 to 99.

In FIG. 4, two transistors 63 and 64 are electrically connected to the stator winding 58 and two transistors 65 and 66 are electrically connected to the stator winding 57. Each transistor is of pnp type. Each of the windings 57 and 58 has a center tap, thus forming two portions, as shown in FIG. 3. The two windings 57 and 58 are angularly displaced 90° from each other. The circuit of FIG. 4 further comprises four resistors 69, 70, 71 and 72. The emitters of all four transistors are connected through the resistors 69 and 71 to the positive pole of the direct voltage source, represented by a positive bus and terminal.

The one current terminal of each Hall generator that is positive relative to the potential of the Hall voltage electrodes, is connected to the same positive pole of the direct voltage supply in series with the resistor 70 or 72. The midpoints of the stator windings 57 and 58 are both connected to the negative pole of the direct voltage source, represented by a common negative bus and negative terminal. The bias current for the Hall generators 61 and 62 is provided by a voltage source 73 and a variable resistor connected in series with said voltage source.

A brushless motor of the type of FIGS. 3 and 4 is commutated as follows. Since the two Hall generators are spaced 90° from each other, the magnetic field acting upon each Hall generator during rotation of the permanent magnet rotor in synchronism with the rotation and with a cycle of 360°, involves a 90° phase displacement between said two Hall generators. During the periodic changes of intensity of the magnetic field, the Hall generators are traversed by a constant control current $i_s$ (FIG. 4). As explained, the Hall voltage electrodes of each of the two Hall generators are connected to the bases of a pair of transistors. The emitters of the transistor pair appertaining to the same Hall generator of the same type such as, for example, pnp type, are interconnected and attached to one pole of the direct voltage supply either directly or, as illustrated, through a resistor. This one pole is the positive pole for pnp transistors. One of the control current terminals of each Hall generator, more particularly, the one which has a more positive potential than the Hall voltage electrodes of a pnp transistor, is connected directly or through a resistor to the same pole of the direct voltage supply to which the emitter connections of the two appertaining transistors are also connected either directly or through a resistor. With each of these connections, the control of the four transistors is by the potential difference between one of the two current terminals of each Hall generator and its Hall voltage electrodes.

In FIG. 4, the midpoints of the two stator windings are connected to each other. The two transistors controlled by one of the Hall generators are alternately blocked, each time for 180° rotation of the rotor. Each Hall generator must be correctly correlated to the appertaining stator winding so that the transistors are blocked during just those intervals of time in which the electromotive force which the rotation of the rotor induces in the winding portions between collector and the center tap has the same direction as the supply voltage (180° rotor rotation). If, for example, the motor is a miniature motor operated from a battery, then the two transistors of each Hall generator are blocked during those intervals in which the rotor by its rotation generates in the appertaining half-portion of the stator winding a voltage of the same polarity as the battery voltage. The speed of the motor may be regulated by controlling the constant control current $i_s$ of the Hall generators in dependence upon the speed of rotation of said motor. The motor is used in electromagnetic transcription for driving.

Since the speed of the integrating motor 5 is always proportional to the output voltage of the frequency to voltage converter 4 (FIG. 1), the position or count condition of a roller counting mechanism or counter 6 (FIG. 1), which is mechanically driven by said motor is a measure of the length of yarn 1 passing or moving across the measuring roller 2. The counter 6 is coupled to the motor 5 and counts in cooperation with said motor to indicate a desired length of yarn.

To control subsequent work processes or operations, it is recommended that the counter or roller counting mechanism 6 of FIG. 1 be adjusted, for example, manually, to the desired yarn length. The motor 5 then drives the counter 6 backward so that said counter counts backward. When the counter 6 reaches zero or a zero count, the desired length of yarn 1 is indicated.

When the counter 6 reaches zero it produces a pulse which is supplied to a cutter control unit 7. A yarn cutter 8 is connected to the cutter control unit 7. When the pulse is supplied to the yarn cutter 8 by the cutter control 7, said yarn cutter cuts the yarn 1. The yarn cutter 8 may be replaced by any suitable device for performing a desired operation.

The apparatus of the present invention is relatively simple in structure and is very accurate, to about 1%, and may function together with other yarn regulating devices such as, for example, broken end detectors.

While the invention has been described by means of a specific example and in a specific embodiment, we do not wish to be limited thereto, for obvious modifications will occur to those skilled in the art without departing from the spirit and scope of the invention.

We claim:

1. Apparatus for measuring the length of yarn moving past a measuring point, comprising
   pulse generating means driven in synchronism with the speed of movement of the yarn for producing output pulses corresponding in number to the length of the yarn;
   frequency to voltage converting means coupled to the output of said pulse generating means for converting the frequency of the output pulses of said pulse generating means to a corresponding voltage;
   an integrating motor connected to the output of the converting means, said motor having a rotary speed proportional to the voltage produced by said converting means; and counter means coupled to said motor for counting in cooperation with said motor to indicate a desired length of yarn.

2. Apparatus as claimed in Claim 1, wherein said counter means is set to a count corresponding to a desired length of yarn and said motor drives said counter means backward so that the desired length of yarn is indicated when said counter means reaches a zero count.

3. Apparatus as claimed in Claim 1, wherein said integrating motor comprises a brushless DC motor.

4. Apparatus as claimed in Claim 1, further comprising a measuring roller at said measuring point in contact with said yarn for rotating with movement of said yarn, and wherein said pulse generating means is coupled to said measuring roller.

5. Apparatus as claimed in Claim 1, wherein said pulse generating means comprises a rotary member and magnetic means for indicating the revolutions thereof.

6. Apparatus as claimed in Claim 1, further comprising yarn cutting means connected to the output of said counter means for cutting said yarn when said counter means reaches a zero count.

7. Apparatus as claimed in Claim 2, further comprising a measuring roller at said measuring point in contact with said yarn for rotating with movement of said yarn and yarn cutting means connected to the output of said counter means for cutting said yarn when said counter reaches a zero count, and wherein said integrating motor comprises a brushless DC motor and said pulse generating means comprises a rotary member coupled to said measuring roller and magnetic means for indicating the revolutions thereof.